(12) United States Patent
Drecq

(10) Patent No.: US 6,478,126 B2
(45) Date of Patent: Nov. 12, 2002

(54) EDDY-CURRENT BRAKE DEVICE

(76) Inventor: Daniel Drecq, 8, rue Octave Allaire, 78610 Sant Leger en Yvelines (FR)

( * ) Notice: Subject to any disclaimer, the term of this patent is extended or adjusted under 35 U.S.C. 154(b) by 0 days.

(21) Appl. No.: 09/793,106

(22) Filed: Feb. 27, 2001

(65) Prior Publication Data

US 2001/0018998 A1 Sep. 6, 2001

(30) Foreign Application Priority Data

Mar. 3, 2000 (FR) .............................................. 00 02737

(51) Int. Cl.$^7$ .............................................. F16D 65/78
(52) U.S. Cl. ................................ 188/264 D; 188/71.6; 188/155; 188/156
(58) Field of Search ................................ 188/71.6, 155, 188/156, 158, 161, 162, 164, 264 F, 264 R, 264 D

(56) References Cited

U.S. PATENT DOCUMENTS

| | | | | |
|---|---|---|---|---|
| 2,747,702 A | | 5/1956 | Van Zelm .................... 188/264 |
| 3,593,828 A | * | 7/1971 | Klein .......................... 188/274 |
| 3,633,714 A | * | 1/1972 | Klaue .......................... 188/134 |
| 3,637,053 A | * | 1/1972 | Boyles ....................... 188/71.1 |
| 3,638,773 A | * | 2/1972 | Lewis et al. ............... 192/18 A |
| 3,870,118 A | * | 3/1975 | Klaue .......................... 180/75 |
| 3,915,262 A | | 10/1975 | Klaue .......................... 188/71.6 |
| 3,966,008 A | * | 6/1976 | Klaue .......................... 180/75 |
| 4,036,334 A | * | 7/1977 | Brown .................... 188/264 A |
| 4,445,599 A | * | 5/1984 | Bopp ........................ 192/3.29 |
| 4,689,513 A | * | 8/1987 | Dodt ........................... 310/93 |
| 4,864,173 A | * | 9/1989 | Even ........................... 310/93 |
| 5,135,353 A | * | 8/1992 | Westhoff et al. .............. 415/88 |
| 5,890,983 A | * | 4/1999 | Kawahara et al. .......... 475/149 |
| 6,186,290 B1 | * | 2/2001 | Carlson ....................... 188/164 |
| 6,297,484 B1 | * | 10/2001 | Usui et al. ................... 219/631 |

FOREIGN PATENT DOCUMENTS

| | | | |
|---|---|---|---|
| FR | 2 489 939 | | 3/1982 |
| GB | 2 307 961 A | | 6/1997 |
| GB | 2307961 | * | 6/1997 |

* cited by examiner

Primary Examiner—Jack Lavinder
Assistant Examiner—Devon Kramer
(74) Attorney, Agent, or Firm—Young & Thompson

(57) ABSTRACT

An eddy-current brake device includes at least one heat exchanger for dissipating the thermal energy that is due to the eddy currents during braking. The heat exchanger is designed to define a path for the cooling liquid, which path is predetermined in order to minimize the pressure drops and maximize the rate of flow of cooling liquid circulating through the exchanger, with a view to reducing the variations in working temperature of the heat exchanger. The device may include two symmetric heat exchangers, of which the inlets, the circuits and the outlets for water are arranged symmetrically, so as to compensate for the forces due to the currents of cooling liquid and so as thus to minimize the corresponding residual torque.

20 Claims, 11 Drawing Sheets

EDDY-CURRENT BRAKE DEVICE

BACKGROUND OF THE INVENTION

The invention relates to an eddy-current brake device of the type comprising at least one heat exchanger for dissipating the thermal energy that is due to the eddy currents during braking.

To measure engine performance, particularly the performance of internal combustion engines, use is made of braking devices connected to the output shaft of the combustion engine.

In eddy-current brake devices, a toothed rotor is driven by the output shaft of the combustion engine to be tested. This toothed rotor, which is rotated, has teeth located at the periphery which cut the force lines of the magnetic field created by a coil. The cutting of the magnetic field by the teeth of the rotor and the gap between the lateral faces of the teeth and the adjacent metal parts give rise to eddy currents in the conducting material located on each side of the toothed rotor. These eddy currents generate a substantial amount of thermal energy in this material, which thus has to be cooled in order to remove the heat energy generated by the eddy currents.

To this end, in a known way, heat exchangers are placed on each side of the toothed rotor: these heat exchangers are cooled by a significant flow of cooling liquid.

Bearing in mind the significant braking effect due to the eddy currents, an eddy-current brake can be considered as being a device which converts mechanical braking energy into heat energy that has to be dissipated in these heat exchangers. These heat exchangers are subjected, when the combustion engine undergoing test changes speed and especially when it changes load, to very substantial temperature variations: hence, the material of the exchangers experiences temperature jumps from 20° C. to 400° C. as the speed of and load on the combustion engine increases. These temperature jumps give rise to thermal fatigue of the material of the exchangers, which leads to the appearance of cracks and to swift deterioration of the exchangers.

Numerous heat exchanger systems or principles for eddy-current brakes have been proposed, without yet being able to achieve sufficient endurance or reliability to allow for long-term use.

The mechanical, thermal and hydraulic stresses have led to a preferred type of exchanger in which the path of the cooling liquid involves significant pressure drops, which means that it is not possible to increase the rate of flow of cooling liquid through these exchangers.

In general, cooling water is used by way of preferred cooling liquid. This cooling water enters via an inlet located at the periphery of the exchanger and re-emerges via an outlet located toward the center of the exchanger.

SUMMARY OF THE INVENTION

A first object of the invention is to propose a new heat exchanger arrangement for eddy-current brakes, so that the rate of flow of cooling water can be increased and the temperature level experienced by the material of the exchanger can thus be decreased.

A second object of the invention is to allow long-term operation of an eddy-current brake device, to improve the availability of these devices and the length of time for which they may be used.

A third object of the invention is to reduce the pressure drops experienced by the cooling liquid as it circulates through the exchanger.

A fourth object of the invention is to propose an eddy-current brake device configuration in which the precision and quality with which engine torque is measured are increased, by virtue of a decrease in the torque induced by the cooling water circuits.

A fifth object of the invention is to propose a heat exchanger configuration that can replace heat exchangers for eddy-current brakes of the known type.

A subject of the invention is an eddy-current brake device, of the type comprising at least one heat exchanger for dissipating the thermal energy that is due to the eddy currents during braking, characterized in that the heat exchanger is designed to define a path for the cooling liquid, which path is predetermined in order to minimize the pressure drops and maximize the rate of flow of cooling liquid circulating through the exchanger, with a view to reducing the variations in working temperature of the heat exchanger.

The device according to the invention comprises two symmetric heat exchangers, of which the inlets, the circuits and the outlets for water are arranged symmetrically, so as to compensate for the forces due to the currents of cooling liquid and so as thus to minimize the corresponding residual torque.

According to other features of the invention:
- the path of cooling liquid is predetermined so that the circulation of the cooling liquid is practically constantly in one and the same direction of winding,
- the path of the cooling liquid may comprise several sections, for example of rectangular profile or of rectangular and semi-toroidal profile, connected together by connecting ducts; or, alternatively, the path of the cooling liquid may be shaped approximately in the form of a spiral,
- the path of the cooling liquid may, in another embodiment, be produced at least partially by winding a tube of approximately constant cross section,
- the circulation of liquid in each of the two exchangers is preferably approximately about the axis of rotation of said rotor, the directions of circulation in said two exchangers being the opposite of one another.

BRIEF DESCRIPTION OF THE DRAWINGS

The invention may be better understood by virtue of the description which will follow, given by way of nonlimiting example with reference to the appended drawings, in which.

DETAILED DESCRIPTION OF THE PREFERRED EMBODIMENTS

Figure 1:
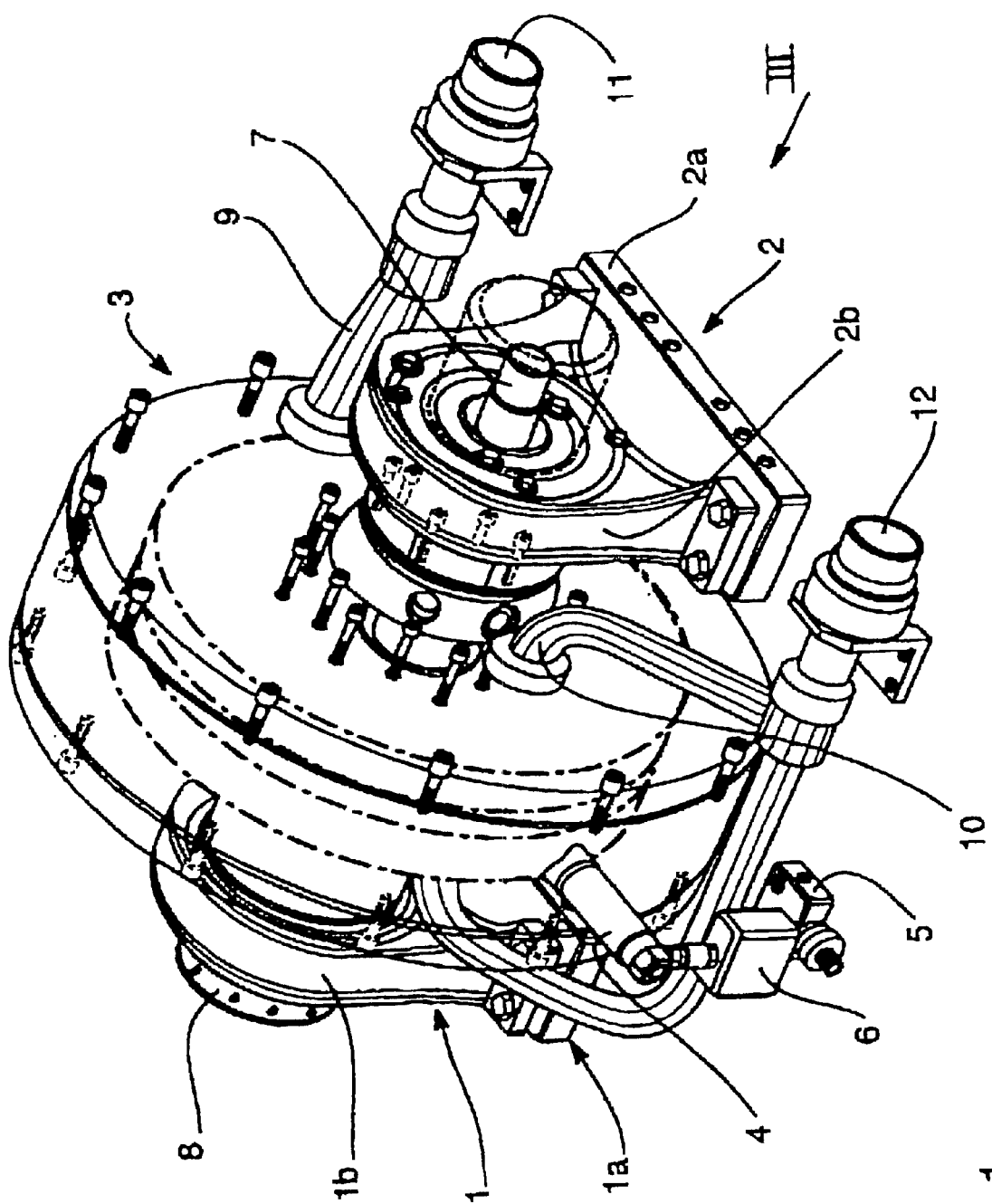
FIG. 1 schematically depicts a perspective view of an eddy-current brake device, FIG. 2 schematically depicts a view in part section on a vertical plane passing through the axis of rotation of the toothed rotor of an eddy-current brake device, FIG. 3 schematically depicts an elevation in the direction of arrows III of FIGS. 1 and 2 of an eddy-current brake device, FIG. 4 schematically depicts a partial view in elevation and a view in section on IV—IV of a heat exchanger of a known type for an eddy-current brake, FIG. 5 schematically depicts a part view in elevation with section on V—V of a heat exchanger according to the invention, FIG. 6 schematically depicts a comparative diagram of temperature profile as a function of engine speed of a combustion engine to be tested, FIG. 7 schematically depicts a part view in elevation and a part view in section on VII—VII of another heat exchanger according to the invention, FIG. 8 schematically depicts a view in section of an eddy-current brake device according to the invention, with two heat exchangers, FIG. 9 schematically depicts a perspective view of an eddy-current brake device according to the invention, with two symmetric heat exchangers.
Figure 2:
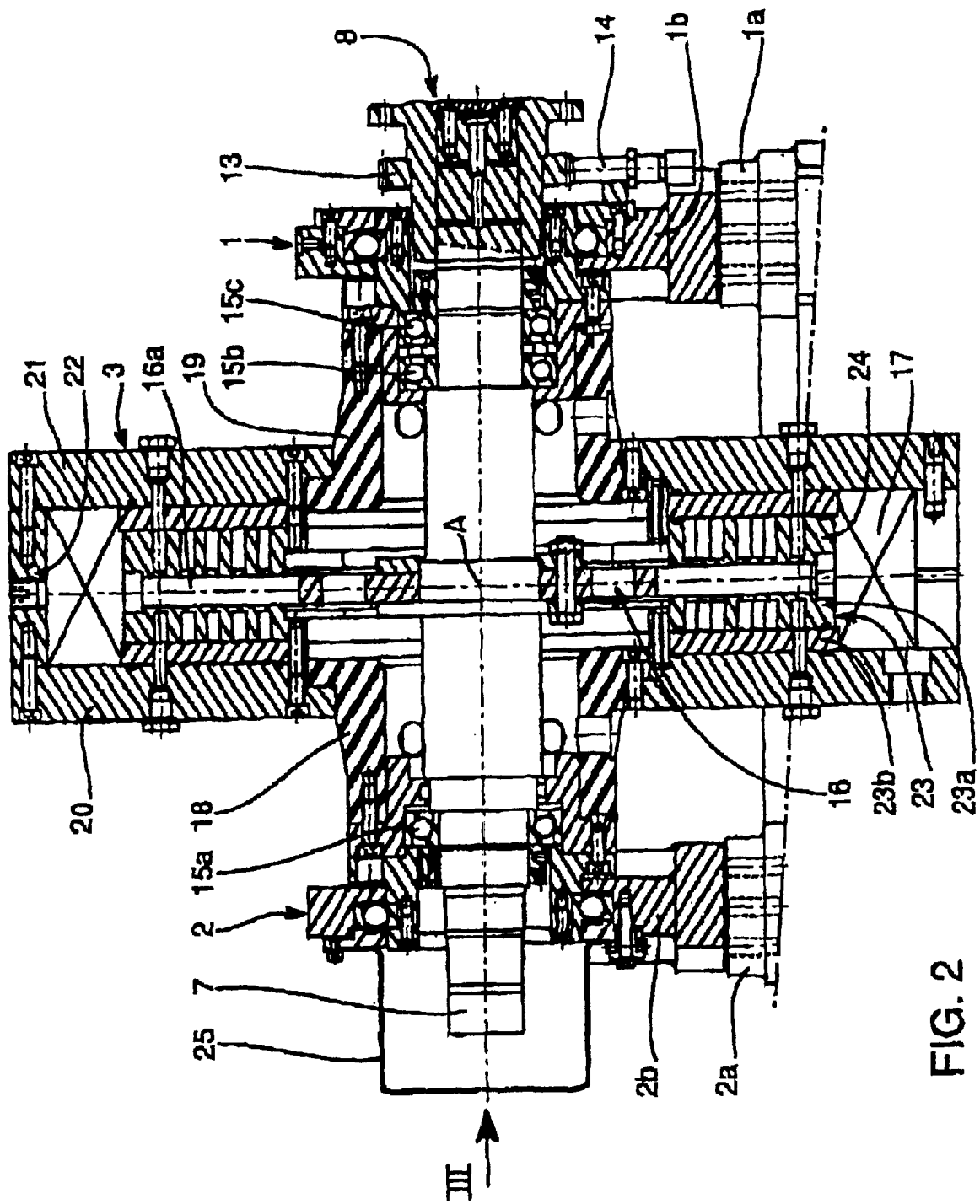
Figure 3:
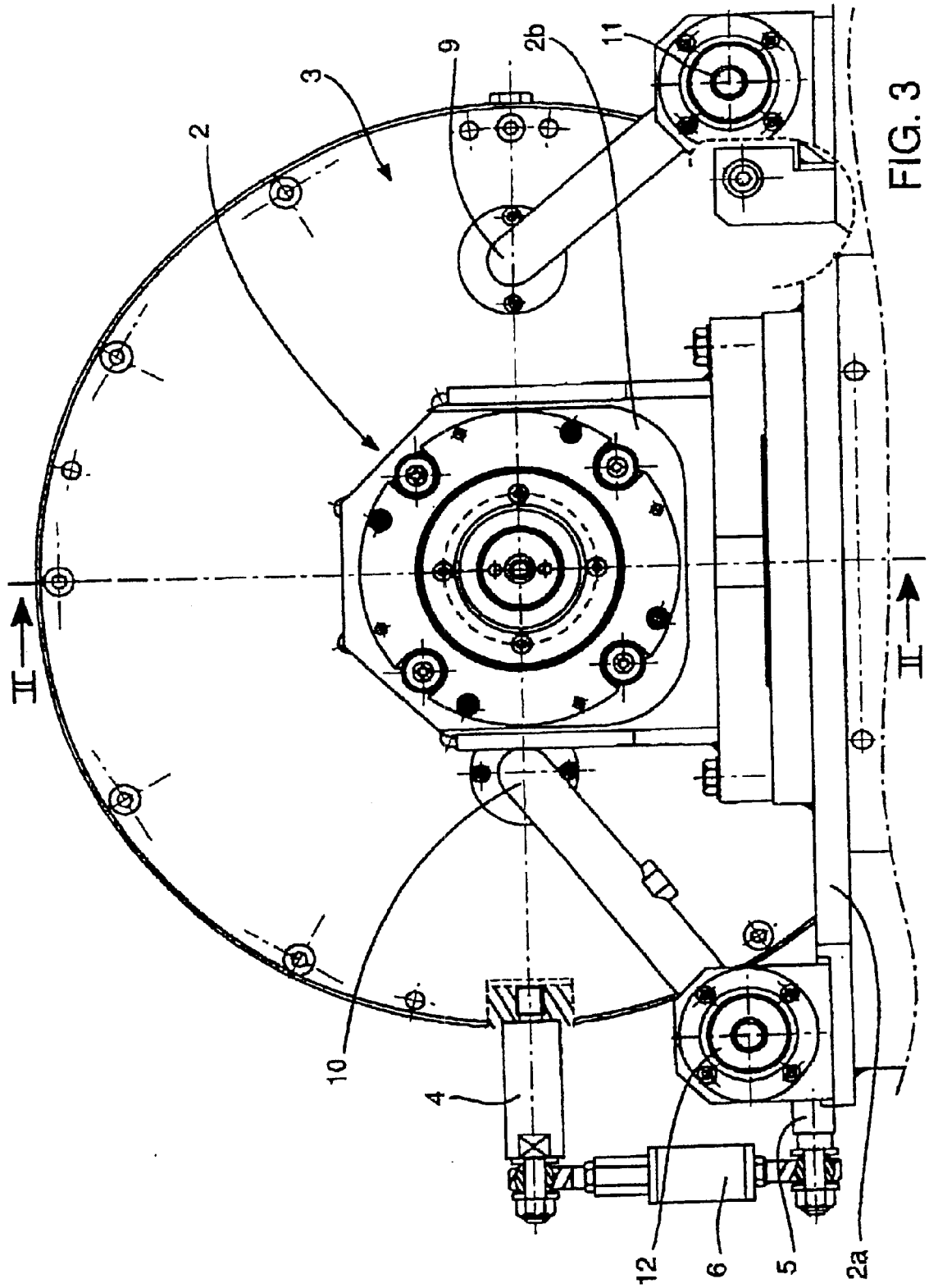

With reference to FIGS. 1 to 3, elements which are identical or functionally equivalent are labeled with identical reference figures.

In FIG. 1, an eddy-current brake device is mounted on two assemblies 1 and 2 forming a rotation bearing. Each bearing 1 or 2 comprises a mounting plate 1a or 2a for attachment to a bed and a support 1b or 2b. The supports 1b and 2b consist of oscillating bearings supporting the body 3 of the device.

The body 3 comprises an extension 4 constituting an anti-rotation arm which is connected to an element 5 secured to a stationary bed by a load sensor 6 that allows the braking torque generated by the eddy-current device to be determined.

A shaft 7 intended to be coupled to a combustion engine is mounted to rotate freely inside the body 3 of the device, from which it protrudes at a rear end and at a front end 8 consisting of a flange for coupling to a combustion engine, not depicted.

A peripheral cooling-water inlet 9 provides the supply for a heat exchanger internal to the body, while an outlet 10 near the center of the body 3 allows this cooling water out. As a preference, the device has two water inlets 9 and two water outlets 10: the cooling-water inlets 9 are connected together and coupled to a common supply 11, while the water outlets 10 are connected together and coupled to a common discharge 12.

Because the cooling-water inlets 9 and the cooling-water outlets 10 are located on different radii and are inclined with respect to these inlet and outlet radii at a large angle of about 45 degrees of angle, residual torque occurs as a result of the circulation of the cooling water.

The value of this torque, measured by the load sensor 6 in the absence of any engine to be measured, varies according to variations in the pressure, the flow rate of the water, and the internal pressure drops within the exchangers. This residual torque in fact leads to a measurement error in subsequent measurements of torque on the engines that are to be measured.

In FIG. 2, the shaft 7 for coupling to the combustion engine, not depicted, carries a toothed wheel 13 that allows the rotational speed to be measured using a tachometric sensor 14 fixed to the support 1b. The shaft 7 intended to be coupled to the combustion engine, not depicted, is mounted to rotate freely on rolling bearings 15a, 15b, 15c, and also carries a rotor 16 rotated by the shaft and carrying teeth 16a that cut the magnetic flux generated by a magnetic coil 17 located at the periphery. The body 3 of the brake device oscillates on the bearings 1 and 2 and comprises two central parts 18 and 19 made of light alloy and two plates 20 and 21 carrying the coil 17, spaced apart by a cylindrical part 22. The plates 20 and 21 act as supports for two exchangers 23 and 24 located one on each side of the rotor 16 rotated by the shaft 7 while the combustion engine is being tested.

When the forces lines of the magnetic field created by the magnetic coil 17 are cut by the toothed rotor 16 rotated by a combustion engine that is to be tested, eddy currents develop mainly in the material of the exchangers 23 and 24, the temperature of which rises instantly.

The righting torque exerted by reaction on the body 3 of the device is determined by measuring the load applied to the load sensor 6 located at a known distance from the extension 4 which forms a lever arm of known radius. This thus gives the engine torque of the combustion engine driving the rotation of the shaft 7, while the speed of this combustion engine is measured by the tachometric sensor 14 placed facing the toothed wheel 13. Determining the engine torque and the engine speed allows the power of the combustion engine to be determined instantly during the testing.

Bearing in mind the heating of the material of the exchangers 23 and 24, these exchangers have a great thickness and rectangular ducts of predetermined cross section so as to limit the mechanical deformations and maintain good dimensional stability as they undergo successive heating and cooling.

Although the invention is described with reference to a device comprising a radially external cyclindrical spacer 22, it is not in any way restricted to this particular embodiment and also covers any other type of eddy-current brake device, for example devices comprising two coils placed on the outside of the body and allowing air trapped at the top of the teeth of the rotors to be removed.

In FIGS. 2 and 3 it can be seen that the protruding end of the shaft 7 is protected by a cap 25 attached by appropriate screws.

Figure 4:
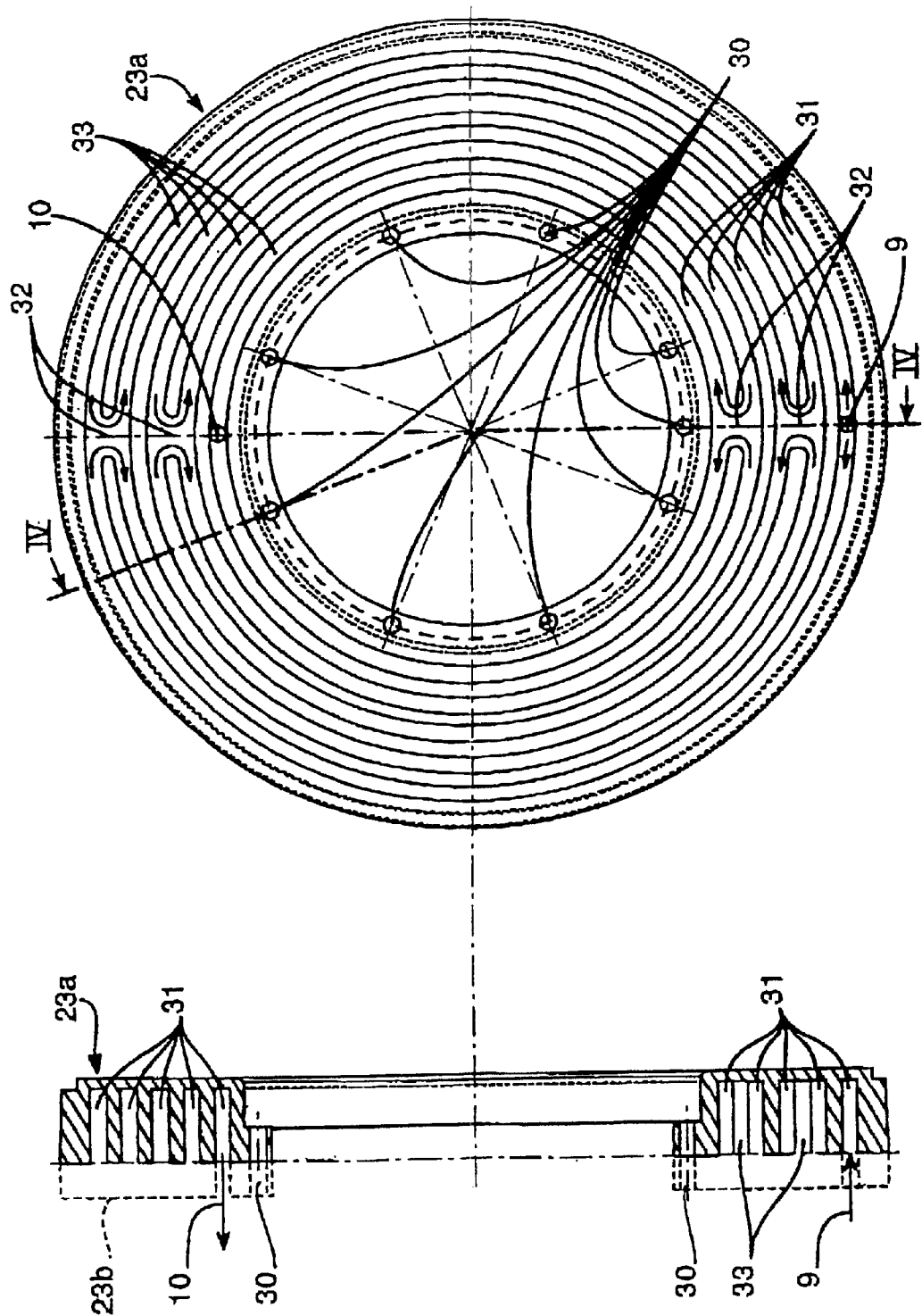

With reference to FIG. 4, a part 23a of a heat exchanger of known type is depicted in solid line, while its cover plate 23b, which may also be produced directly in the plates 20 and 21, is depicted in broken line. The part 23a is made of very thick plate, preferably by machining, so as to have holes 30 for positioning and attachment to the plate 23b forming a cover and so as to have rectangular water-circulation ducts 31.

The water inlet and the water outlet are both located on the same diameter: the water inlet 9 is located on the diametrical axis of the outermost circular groove, while the water outlet 10 is located on the innermost circular groove. Each water-passage groove 31 is connected to the next water-passage groove by a passage 32 made in a partition 33, so as to define semicircular paths for the cooling water.

The water thus enters by the inlet 9, each half of the flow spreading out across each part of the first circular groove 31 to make half a turn, the two halves meeting at the first passage 32 and splitting again half into each of the next half-turns in the next circular groove 31 and so on, as far as the water outlet 10. This embodiment makes it possible to obtain an exchanger construction which has good rigidity and good stability to repeated deformation brought about by thermal expansion. The water may also be circulated in the opposite direction, that is to say entering via the passage 10 located on the most central groove and leaving via the groove 9 located furthest toward the outside. However, that method of circulation has the drawback of passing approximately half the totalflow of water through each exchanger half-turn, and also the drawback of a sharp pressure drop at the changes of direction of the water flow at each passage 32. This then results in a limitation in the rate at which the cooling water can flow through the exchanger, because any attempt at increasing the flow rate very soon leads to turbulent flow which can no longer effectively cool the exchanger when the combustion engines under test experience a rapid rise in speed or load.

These drawbacks are also encountered if attempts are made at reversing the direction of flow of water by causing the water to enter via the passage 10 and removing it via the passage 9.

Figure 5:
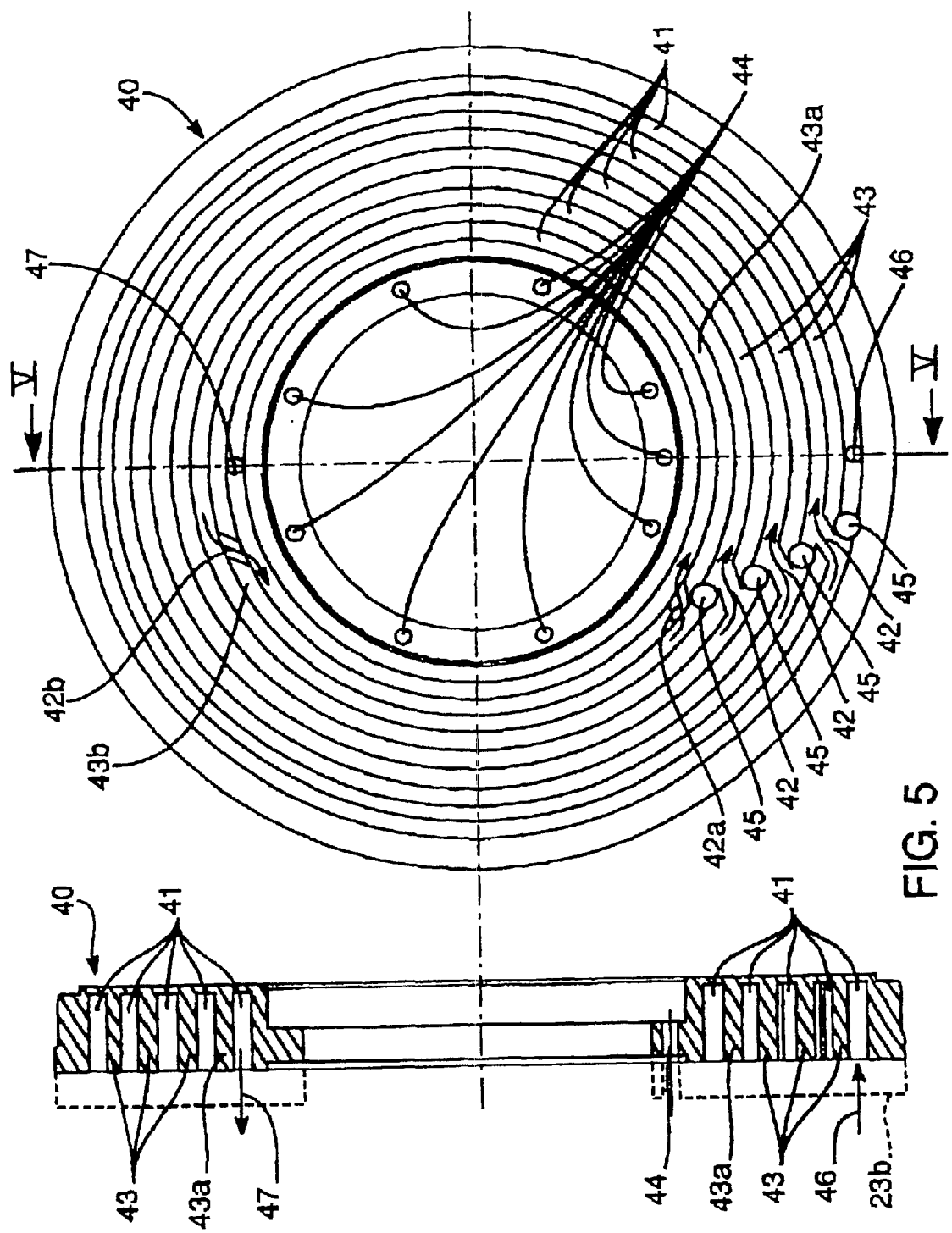

With reference to FIG. 5, part 40 of the exchanger can replace part 23a of known type to form, with a cover plate 23b of known type, an exchanger according to the invention.

The exchanger part 40 according to the invention is constructed to define a predetermined path for the cooling water, minimizing pressure drops by comparison with the known exchanger described with reference to FIG. 4 and maximizing the flow of coolant circulating through the exchanger, with a view to reducing the variations in working temperature of the exchanger.

To this end, the exchanger part 40 according to the invention has a number of circular ducts 41 of rectangular cross section.

The circular ducts 41 thus have, at least locally, a toroidal shape of rectangular or rectangular and semi-toroidal cross section.

The invention proposes a cooling water path designed to minimize pressure drops, because the circulation of cooling water is practically constantly in one and the same direction of winding. To this end, provision is made for the toroidal cross sections defined by the circular ducts 41 to be connected in such a way as to define a constant direction of circulation in one and the same direction of winding by virtue of the fact that the cooling water is ducted through passages 42, 42a and 42b. The passages 42 are passages made in the ribs 43 that remain by machining in the direction of flow of the cooling water so as to minimize the pressure drops. The passages 42 are machined over the entire height of the ribs 43. The passages 42a and 42b are made mid-way up the rib 43a, and are also machined in the direction of flow of the cooling water. Each passage 42a or 42b is defined to allow approximately half the nominal flow rate of water flowing through a groove 41 to pass.

Fixing orifices 44 identical to the positioning and fixing orifices 30 of FIG. 4 are also provided, to allow interchangeability of a part 23a of known type, with a part 40 of an exchanger according to the invention.

In order to avoid any counter-flow circulation of cooling water, the toroidal ducts 41 are advantageously blocked with pegs 45 located near the passages 42.

The pegs 45 are preferably pushed into machinings or drillings made for that purpose, it being emphasized that the blocking achieved by each peg 45 placed in a corresponding duct 41 is over practically the entire height of the duct 41.

Thus, by virtue of the invention, a heat exchanger for an eddy-current brake device can be produced very simply by circular machining of grooves 41, oblique milling of passages 42, 42a and 42b, and by using cylindrical pins 45 to block the ducts 41 machined in very thick plate.

The cooling water enters, for example, via a water inlet 46 located at the same place as the water inlet 9 described with reference to FIGS. 1 to 4 and leaves, for example, via an outlet 47 located at the same place as the water outlet 10 described with reference to FIGS. 1 to 4.

It is also possible to envision an embodiment analogous with that of FIG. 5, by reversing the direction of flow of water, without departing from the scope of the present invention.

Figure 6:
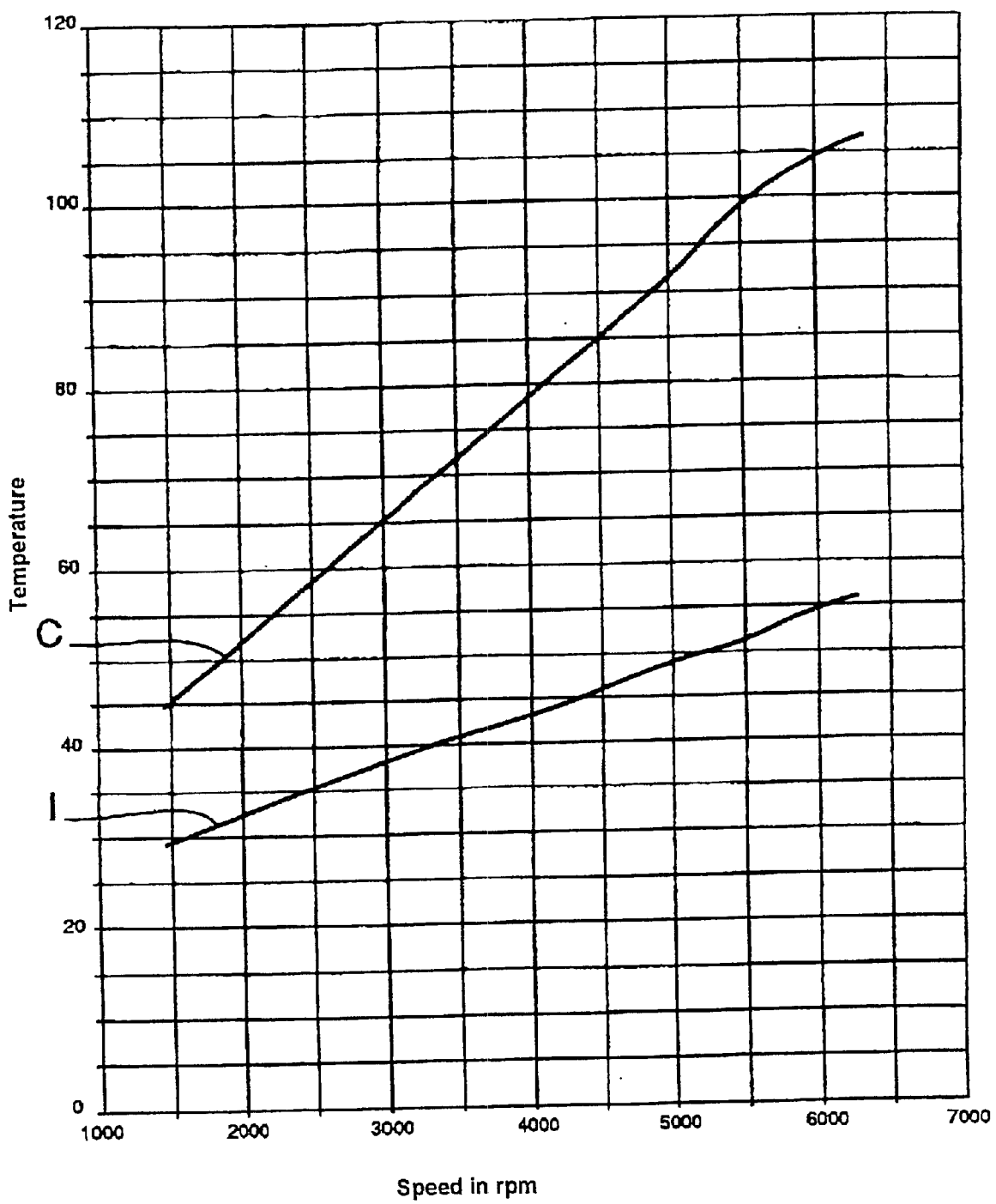

With reference to FIG. 6, a comparative diagram indicates the difference in water temperature at the inlet and at the outlet of two heat exchangers for an eddy-current brake device.

The upper curve C is a test curve produced using an exchanger of known type described with reference to FIG. 4, while the lower curve I is produced using a heat exchanger according to the invention, described with reference to FIG. 5.

A comparison of the two curves demonstrates the fact that the increase in engine speed, at constant load, from 1500 rpm to 6000 rpm gives rise to an increase in temperature difference between the outlet and the inlet which rises from 45° C. at 1500 rpm to 105° C. at 6000 rpm. This variation in temperature difference is testimony to the significant heating in the heat exchanger of known type described with reference to FIG. 4.

By contrast, by virtue of the invention, the temperature difference between the outlet and the inlet rises from 30° C. at 1500 rpm to 55° C. at 6000 rpm which appreciably reduces the fatigue due to thermal expansion of the heat exchanger according to the invention described with reference to FIG. 6.

This advantageous arrangement thus allows an eddy-current device to be used for a longer length of time using an exchanger according to the invention, due to the greater life of the heat exchanger according to the invention.

The invention extends not only to the case of eddy-current brake devices incorporating the heat exchanger according to the invention, but also to heat exchangers for eddy-current brake devices considered as spare parts or replacement parts for an exchanger of known type.

Figure 7:
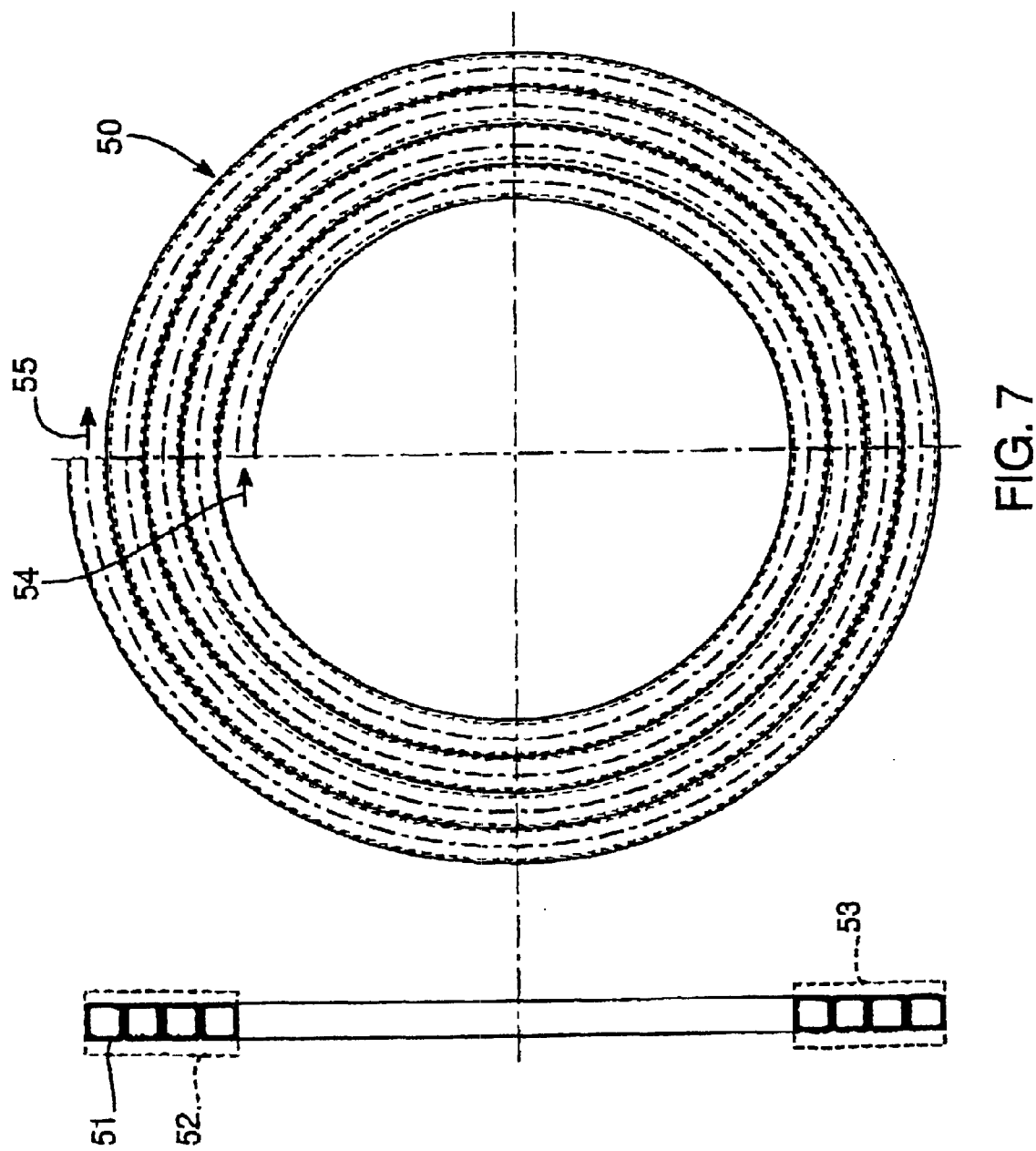

With reference to FIG. 7, another embodiment according to the invention of a heat exchanger for an eddy-current brake device comprises a part 50 consisting of a square or rectangular tube 51 bent into the form of a spiral.

The tube 51 preferably has a thickness greater than 2 mm, so that it has good rigidity and low deformation in bending.

To avoid any lateral deformation of the spiral, two thick supporting discs 52 and 53 may advantageously be provided, one on each side of the spiral-wound tube. This heat exchanger according to the invention has the advantage of being simple and economical to manufacture, while at the same time allowing all of the water flow to pass and minimizing the pressure drops as it does so. To further reduce the pressure drops it is possible to envision a water inlet 54 approximately tangential to the spiral winding and a cooling-water outlet 55 approximately tangential to the outside diameter of the spiral winding.

It is also possible, without departing from the scope of the present invention, to reverse the direction of circulation.

Finally, in order to produce a spiral-shaped path for the water, it is possible to machine a spiral groove directly in thick plate using a numerically controlled machine.

However, this machine is more difficult because the machining depth is very much greater than the width of the machined groove.

The spiral-shaped groove that remains after machining needs to have a profile which has a very strong base to avoid any cracking as the exchanger goes through thermal cycling.

Figure 8:
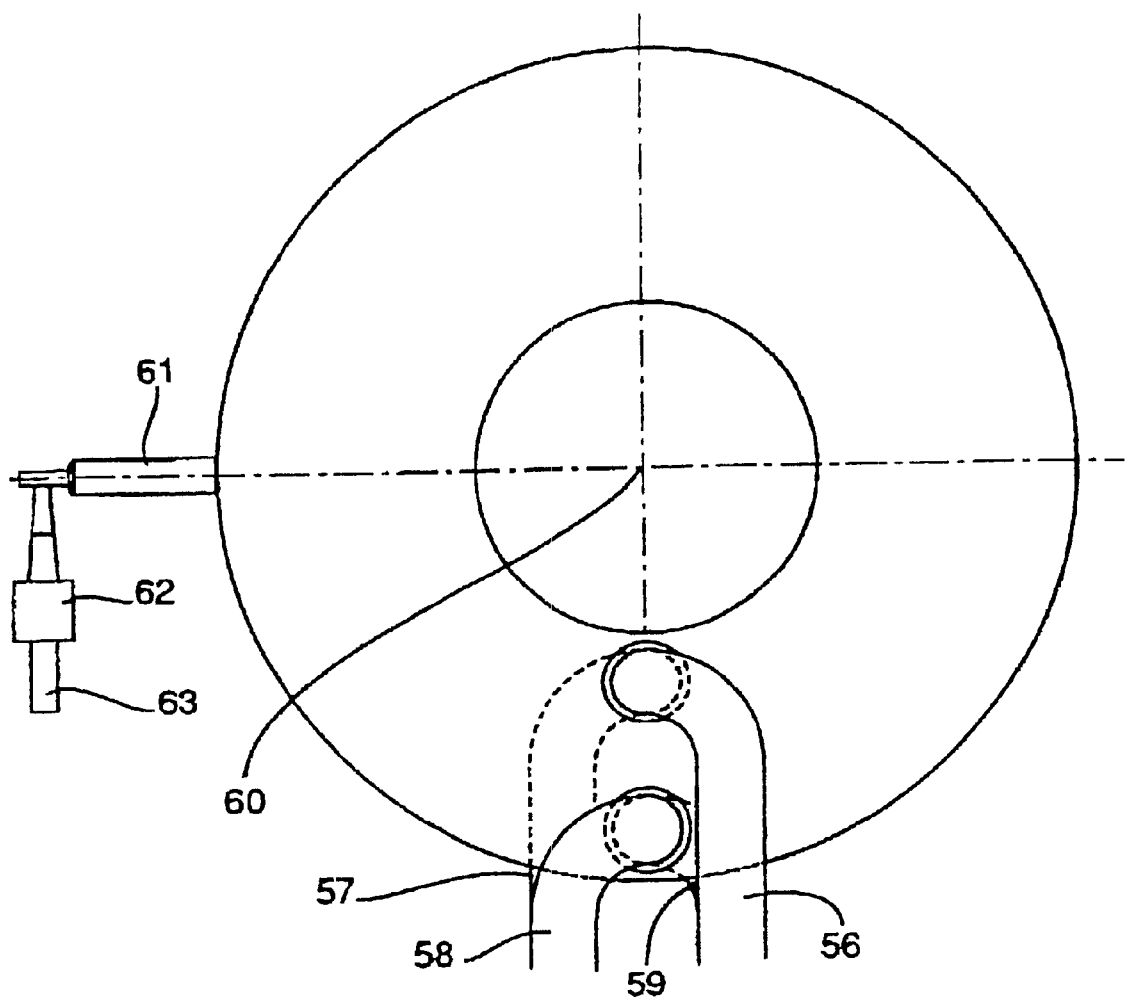

With reference to FIG. 8, an eddy-current brake device according to the invention comprises two heat exchangers according to the invention with the water circulating in a spiral.

The two exchangers are preferably identical, so as to reduce their costs of manufacture and are arranged one on each side of the rotor 16, rotated through 180° one with respect to the other about an axis roughly perpendicular to the axis 60 of the device. As a preference, they are approximately symmetric with each other with respect to a vertical axis passing through the center A of the rotor 16. The directions of circulation of the cooling water in the two exchangers are thus opposed, which allows the forces and the moments of the forces exerted on the brake device by the circulation of water through the two exchangers to practically compensate one for the other, give or take the differences in pressure drop between the two exchangers.

The water inlet 56 of the first exchanger and the water inlet 57 of the second exchanger are symmetric with one another with respect to a vertical plane approximately perpendicular to the axis of rotation 60 of the rotor 16. Likewise, the water outlet 58 of the first exchanger and the water outlet 59 of the second exchanger are symmetric with respect to this plane.

Because of the symmetry of the forces due to the water inlets and outlets of the exchangers and because of the symmetry of the circulations of water through the two exchangers, no appreciable residual torque is detected by the load sensor 62 mounted between the approximately horizontal anti-rotation arm 61 and an element 63 secured to the bed, not depicted.

This advantageous arrangement of the water inlets 56, 57 and the water outlets 58, 59 of the exchangers according to the invention with cooling circuits in the form of symmetric spirals, entails difficult machining of spiral-shaped grooves using a numerically controlled machine.

Figure 9:
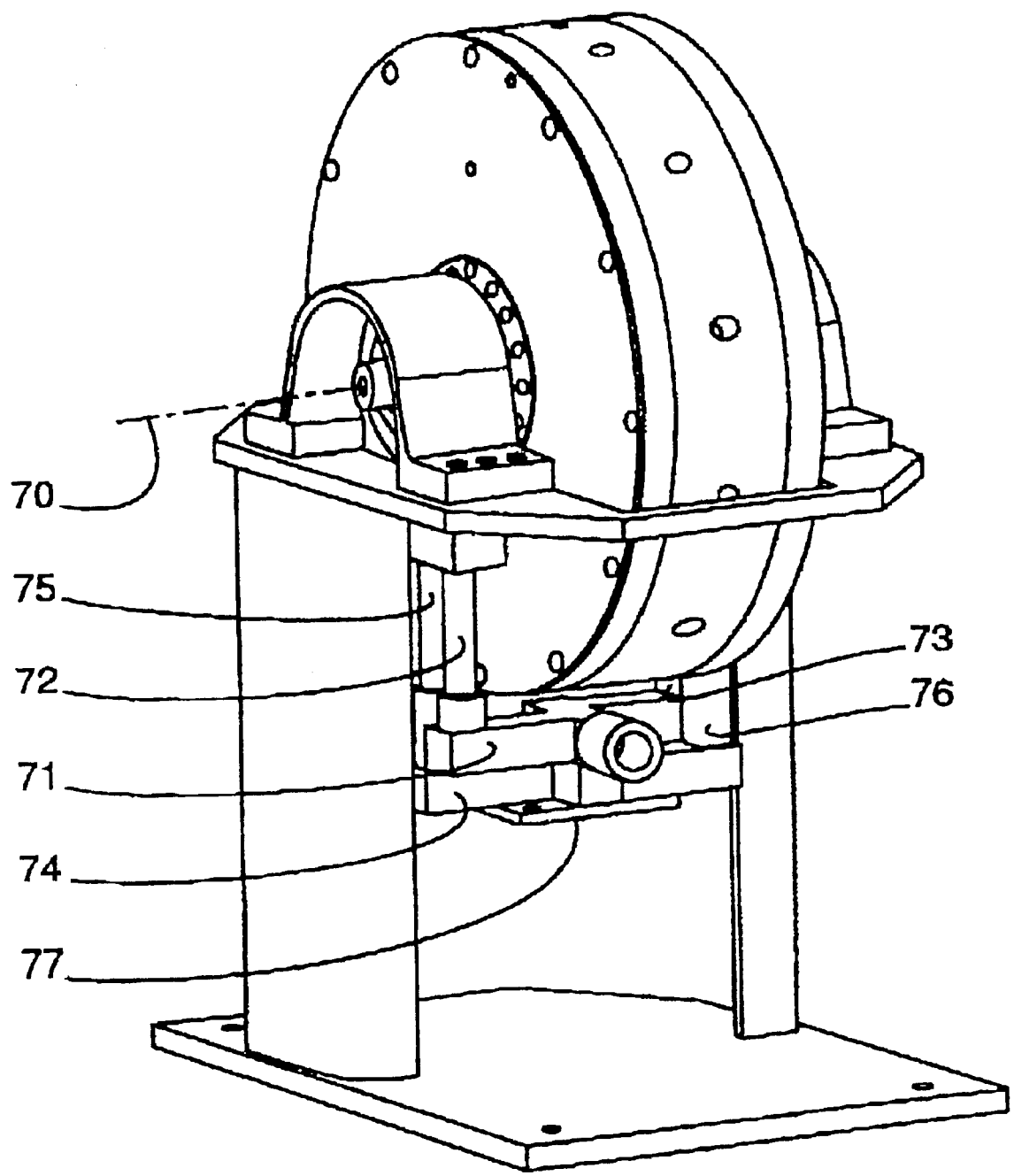

With reference to FIG. 9, another embodiment of the device according to the invention comprises two heat exchangers symmetric with one another with respect to a vertical axis passing approximately through the center A of the rotor 16.

This device comprises a water inlet box 71 supplying the water inlet 72 of the first exchanger and the water inlet 73 of the second exchanger, and a water outlet box 74 receiving the water leaving the water outlet 75 of the first exchanger and the water outlet 76 of the second exchanger. The water inlets 72 and 73 are symmetric with one another with respect to a vertical axis passing approximately through the center A of the rotor 16. Likewise, the water outlets 74 and 75 are symmetric with respect to the axis passing approximately through the center A of the rotor 16 and perpendicular to the horizontal plane of measurement of the anti-rotation arm, not depicted.

The boxes 71 and 72 are mounted joined together and are fixed to a mounting plate 77 for mounting on a support, not depicted.

The symmetrical arrangements of the cooling-water circuits has the result of compensating for the torques that vary with variations in pressure, water flow rate, and corresponding pressure drops.

Figure 10:
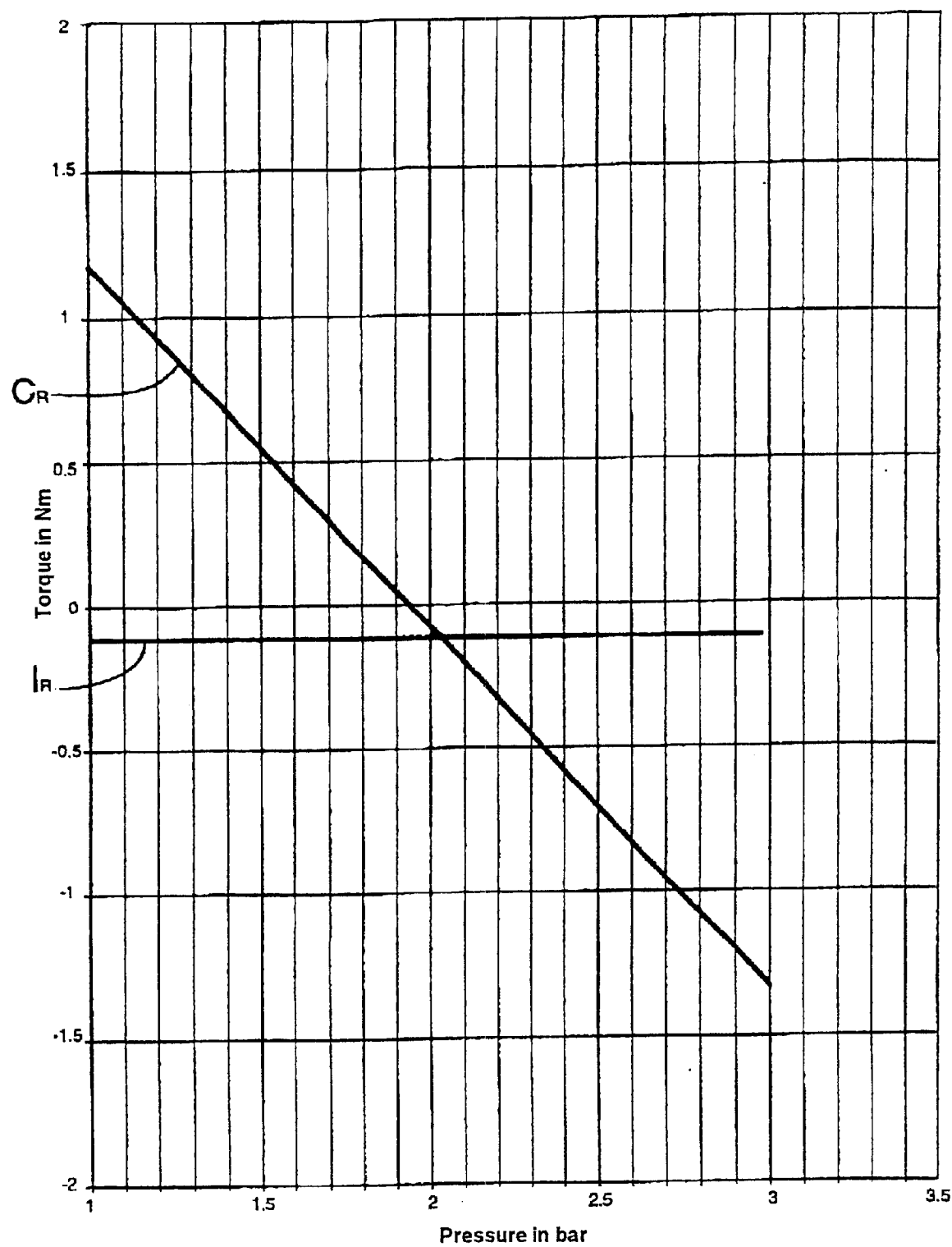
FIG. 10 depicts a diagram showing the influence of supply pressure on torque measurement.

With reference to FIG. 10, a comparative diagram indicates the residual torque of the device as measured by the load sensor, in the absence of any engine to be measured, as a function of the cooling water supply pressure.

When the supply pressure varies from 1 to 3 bar, the curve $C_R$ relating to a device of known type shows a variation in residual torque from +1.18 Nm to −1.35 Nm, namely an amount of variation of 2.53 Nm measured by the load sensor.

By contrast, when the supply pressure varies from 1 to 3 bar, the curve $I_R$ relating to the device according to the invention of FIG. 9 indicates a variation in residual torque from −0.1 Nm to −0.12 Nm, namely an amount of variation of 0.02 Nm measured by the load sensor.

Figure 11:
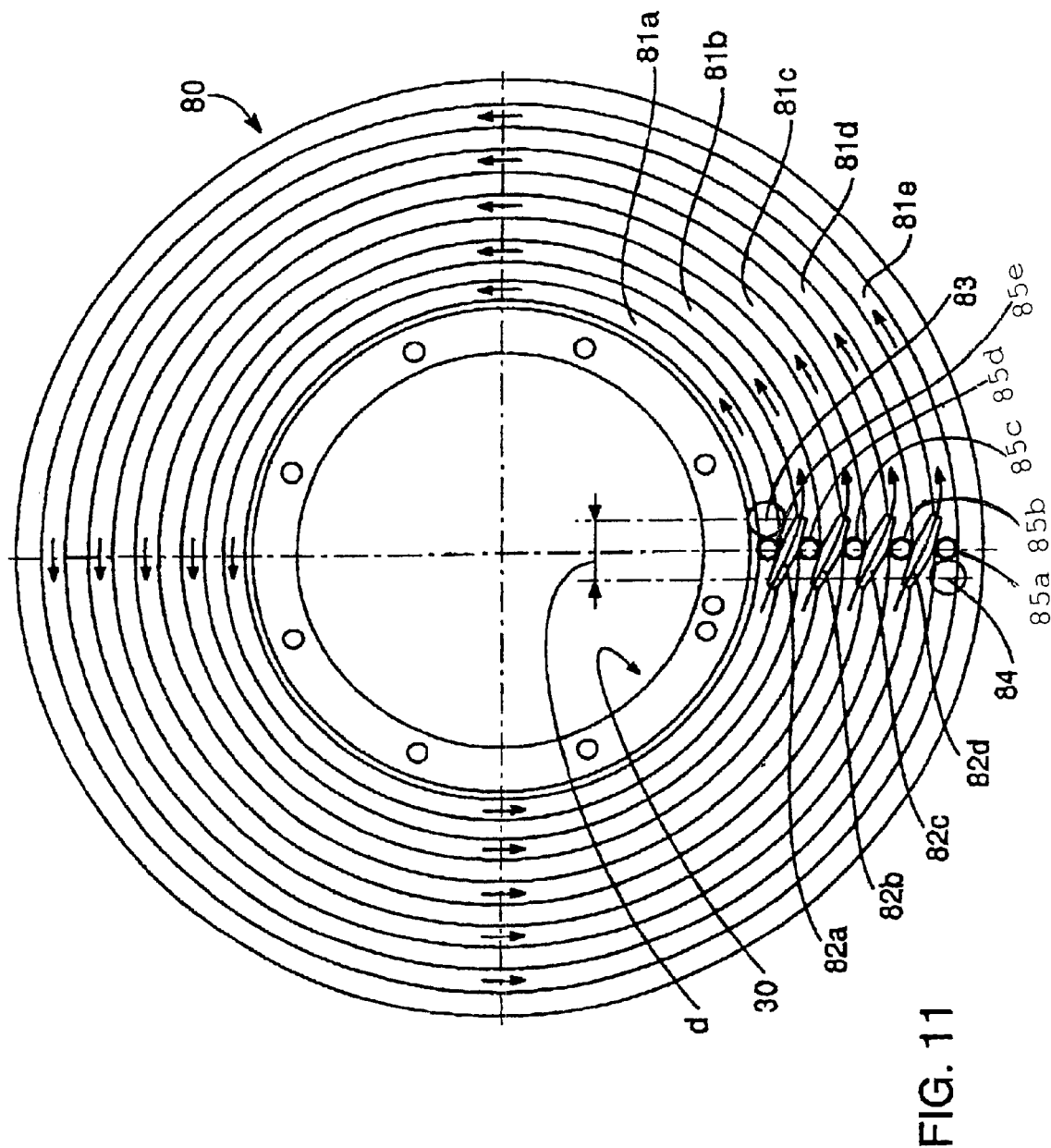
FIG. 11 depicts a plan view of the layout of the heat exchangers according to the invention.

With reference to FIG. 11, an exchange according to the invention intended for a device according to the invention of the kind depicted in FIG. 9 comprises a part 80 designed to define a predetermined path for the cooling water, in the direction of winding corresponding to the circulation arrows, in the ducts 81a to 81e.

The ducts 81a to 81e at least locally have an annular shape of rectangular section or of rectangular and semi-toroidal cross section.

The circular ducts 81a to 81e are connected by passages 82a to 82d machined in the ribs that remain between two consecutive ducts.

Thus, the cooling water entering via a radially inner water inlet 83, supplied, for example, by inlet 72 of FIG. 9, passes through the ducts 81a to 81e in the same direction of winding, passing through the passages 82a to 82d and re-emerges via a radially outer water outlet 84 to pour, for example into the outlet 75 of FIG. 9. The water may also be circulated in the opposite direction, that is to say may enter via the radially outer passage 84 and leave via the radially inner passage 83 without departing from the scope of the present invention.

To minimize the distance d separating the vertical projections of the water inlet 83 and of the water outlet 84, the locations 85a to 85e of the plugging pegs are arranged in a radial alignment, for example along the vertical.

The fact of minimizing the distance d allows the hydraulic mode of operation of the device of FIG. 9 comprising two symmetric heat exchangers according to FIG. 11 to be brought as close as possible to the hydraulic mode of operation of the exchanger of FIG. 8 so as to make the variations in residual torque $I_R$ of the device in the absence of an engine to be measured negligible, as was described with reference to FIG. 10.

However, obtaining a minimized distance d with reference to FIG. 11, entails making passages 82a to 82d of a width smaller than the width of the ducts 81a to 81e; although this modification with respect to FIG. 5 of the machined widths of the passages locally alters the hydraulic conditions by increasing the rates at which water passes and increases the total pressure drop in the exchanger, this modification does not constitute an appreciable drawback with regard to the obtained reduction in residual torque and to the increase in the precision and quality with which the torque of engines to be measured can be measured. What happens is that the measurement precision is close to the observed variation in residual torque; this precision is therefore, by virtue of the invention, about one hundred times better than the precision of the prior art.

The invention described with reference to a number of particular embodiments is not in any way restricted thereto and on the contrary covers any modification in form and any variant form of embodiment that falls within the scope and the spirit of the invention.

What is claimed is:

1. Eddy-current brake device, comprising two heat exchangers for dissipating the thermal energy that is due to eddy currents during braking, wherein each heat exchanger is designed to define a path for circulating a cooling liquid approximately about an axis of rotation of a rotor of said device, said path is predetermined in order to minimize the pressure drops and maximize the rate of flow of cooling liquid circulating through the exchanger for reducing the variations in working temperature of the heat exchanger, and wherein the directions of circulation in said two heat exchangers are opposite of one another so as to compensate for the forces due to currents of the cooling liquid and to minimize a corresponding residual torque.

2. Device according to claim 1, characterized in that the path (41, 51, 81a–81e) of cooling liquid through an exchanger is predetermined so that the circulation of the cooling liquid is practically constantly in one and the same direction of winding.

3. Device according to claim 2, wherein each path for cooling liquid comprises several sections connected together by connecting ducts.

4. Device according to claim 2, wherein each path for cooling liquid is approximately in the form of a spiral.

5. Device according to claim 2, wherein said two exchangers are located one on each side of a rotor of said device.

6. The device according to claim 1, wherein each path for circulating the cooling liquid comprises a plurality of concentric sections connected together by connecting ducts.

7. Device according to claim 6, wherein each path for cooling liquid is approximately in the form of a spiral.

8. Device according to claim 1, characterized in that each path (51) for cooling liquid is approximately in the form of a spiral.

9. Device according to claim 8, wherein each path for the cooling liquid is produced at least partially by winding a tube of approximately constant cross section.

10. Device according to claim 1, characterized in that each path for the cooling liquid is produced at least partially by machining.

11. Device according to claim 10, wherein each path for the cooling liquid is produced at least partially by winding a tube of approximately constant cross section.

12. Device according to claim 1, characterized in that each path (51) for the cooling liquid is produced at least partially by winding a tube (51) of approximately constant cross section.

13. The device according to claim 1, wherein said two heat exchangers are located one on each side of the rotor of said device.

14. Device according to claim 1, characterized in that said two exchangers are approximately identical.

15. The device according to claim 1, wherein said two heat exchangers are located symmetrically with respect to an axis of symmetry which is perpendicular to the axis of rotation of the rotor.

16. The device according to claim 15, wherein respective cooling liquid inlets and outlets of said two heat exchangers are arranged symmetrically with respect to said axis of symmetry.

17. The device according to claim 1, further comprising:

a device body containing said two heat exchangers;

a plurality of oscillating bearings supporting said body; and a shaft mounted so as to rotate with respect to said body, said shaft carrying said rotor and being couplable to an engine for driving said shaft, said body comprising a load sensor for measuring a righting torque exerted on said body so as to determine a torque of said engine, said load sensor being secured to a stationary bed by an anti-rotation arm.

18. An eddy-current brake device comprising:

at least one heat exchanger for dissipating thermal energy formed by eddy currents during braking, wherein said at least one heat exchanger comprises:

an exchanger plate;

a plurality of concentric grooves in said exchanger plate;

a plurality of passages, one of said plural passages connecting a first and second groove of said plural concentric grooves; and a plurality of blocking pegs in each of said plural concentric grooves to permit spiral fluid flow in essentially one direction.

19. The device as claimed in claim 18, wherein each of said plural blocking pegs are adjacent an inlet of each respective said plural passages.

20. The device as claimed in claim 18, wherein each said plural passages form an oblique angle with said plural concentric grooves.

* * * * *